United States Patent
Jeon et al.

(10) Patent No.: US 8,788,889 B2
(45) Date of Patent: Jul. 22, 2014

(54) BIT STREAM ALIASING IN MEMORY SYSTEM WITH PROBABILISTIC DECODING

(75) Inventors: Seungjune Jeon, Milpitas, CA (US); Steven Cheng, Sunnyvale, CA (US)

(73) Assignee: SanDisk Technologies Inc., Plano, TX (US)

(*) Notice: Subject to any disclaimer, the term of this patent is extended or adjusted under 35 U.S.C. 154(b) by 114 days.

(21) Appl. No.: 13/304,272

(22) Filed: Nov. 23, 2011

(65) Prior Publication Data

US 2013/0132798 A1     May 23, 2013

(51) Int. Cl.
    *G06F 11/00*     (2006.01)
    *G06F 11/10*     (2006.01)
    *G06F 13/14*     (2006.01)
    *H04L 1/00*     (2006.01)

(52) U.S. Cl.
    CPC ............ *G06F 11/1048* (2013.01); *G06F 13/14* (2013.01); *H04L 1/0061* (2013.01)
    USPC .......................................................... 714/701

(58) Field of Classification Search
    CPC .... G06F 11/1048; G06F 13/14; H04L 1/0061
    USPC ................... 714/56, 701, 721, 766, 780, 794, 714/763–764, 773, 799
    See application file for complete search history.

(56) References Cited

U.S. PATENT DOCUMENTS

| | | | |
|---|---|---|---|
| 6,097,320 A | 8/2000 | Kuki et al. | |
| 8,151,163 B2* | 4/2012 | Shalvi et al. | 714/758 |
| 8,341,502 B2* | 12/2012 | Steiner et al. | 714/774 |
| 2005/0038977 A1 | 2/2005 | Glew et al. | |
| 2006/0248281 A1 | 11/2006 | Al-Sukhni et al. | |
| 2007/0016839 A1 | 1/2007 | Chiou | |
| 2008/0151617 A1 | 6/2008 | Alrod et al. | |
| 2009/0129153 A1 | 5/2009 | Sarin et al. | |
| 2009/0193319 A1 | 7/2009 | Shen et al. | |
| 2010/0088575 A1 | 4/2010 | Sharon et al. | |
| 2011/0055641 A1* | 3/2011 | Westby et al. | 714/57 |

OTHER PUBLICATIONS

PCT International Search Report and Written Opinion of the International Searching Authority (ISA) issued in International Application PCT No. PCT/2012/066452, United States Patent and Trademark Office, Feb. 20, 2013.

* cited by examiner

*Primary Examiner* — Shelly A Chase
(74) *Attorney, Agent, or Firm* — Martine Penilla Group, LLP

(57) ABSTRACT

An aliasing module is defined and connected to receive a first bit stream to be transmitted over a data bus from a memory to an external controller of the memory. The aliasing module is defined and connected to alias the first bit stream as a second bit stream and transmit the second bit stream over the data bus in lieu of the first bit stream. A de-aliasing module is defined and connected to receive the second bit stream from the data bus at the external controller. The de-aliasing module is defined and connected to de-alias the received second bit stream back to the first bit stream and provide the first bit stream to the external controller for processing.

25 Claims, 12 Drawing Sheets

| Transmitted Bit Stream | Received Bit Stream | | | | | | | | |
|---|---|---|---|---|---|---|---|---|---|
| | 011 | 010 | 001 | 000 | 100 | 101 | 110 | 111 | |
| 011 | $1-3p-3p^2-p^3$ | $p$ | $p$ | $p^2$ | $p^3$ | $p^2$ | $p^2$ | $p$ | Not Monotonic |
| 010 | $p$ | $1-3p-3p^2-p^3$ | $p^2$ | $p$ | $p^2$ | $p^3$ | $p$ | $p^2$ | Not Monotonic |
| 001 | $p$ | $p^2$ | $1-3p-3p^2-p^3$ | $p$ | $p^2$ | $p$ | $p^3$ | $p^2$ | Not Monotonic |
| 000 | $p^2$ | $p$ | $p$ | $1-3p-3p^2-p^3$ | $p$ | $p^2$ | $p^2$ | $p^3$ | Monotonic |
| 100 | $p^3$ | $p^2$ | $p^2$ | $p$ | $1-3p-3p^2-p^3$ | $p$ | $p$ | $p^2$ | Monotonic |
| 101 | $p^2$ | $p^3$ | $p$ | $p^2$ | $p$ | $1-3p-3p^2-p^3$ | $p^2$ | $p$ | Not Monotonic |
| 110 | $p^2$ | $p$ | $p^3$ | $p^2$ | $p$ | $p^2$ | $1-3p-3p^2-p^3$ | $p$ | Not Monotonic |
| 111 | $p$ | $p^2$ | $p^2$ | $p^3$ | $p^2$ | $p$ | $p$ | $1-3p-3p^2-p^3$ | Not Monotonic |

→ V Level

| V Bin | V Level | SB | HB1 | HB2 | HB3 | SB1 | SB2 | SB3 | HB group |
|---|---|---|---|---|---|---|---|---|---|
| 36 | $V0_{7+2}$ | SB=100 | 1 | 0 | 1 | 1 | 0 | 0 | HB=101 |
| 35 | $V0_{7+1}$ | SB=101 | 1 | 0 | 1 | 1 | 0 | 1 | HB=101 |
| 34 | $V0_7$ | SB=001 | 1 | 0 | 1 | 0 | 0 | 1 | HB=101 |
| 33 | $V0_{7-1}$ | SB=001 | 1 | 0 | 0 | 0 | 0 | 1 | HB=100 |
| 32 | $V0_{7-2}$ | SB=101 | 1 | 0 | 0 | 1 | 0 | 1 | HB=100 |
| 31 | $V0_{6+2}$ | SB=100 | 1 | 0 | 0 | 1 | 0 | 0 | HB=100 |
| 30 | $V0_{6+1}$ | SB=110 | 1 | 0 | 0 | 1 | 1 | 0 | HB=100 |
| 29 | $V0_6$ | SB=111 | 1 | 0 | 0 | 1 | 1 | 1 | HB=100 |
| 28 | $V0_{6-1}$ | SB=111 | 1 | 1 | 0 | 1 | 1 | 1 | HB=110 |
| 27 | $V0_{6-2}$ | SB=110 | 1 | 1 | 0 | 1 | 1 | 0 | HB=110 |
| 26 | $V0_{5+2}$ | SB=100 | 1 | 1 | 0 | 1 | 0 | 0 | HB=110 |
| 25 | $V0_{5+1}$ | SB=101 | 1 | 1 | 0 | 1 | 0 | 1 | HB=110 |
| 24 | $V0_5$ | SB=001 | 1 | 1 | 0 | 0 | 0 | 1 | HB=110 |
| 23 | $V0_{5-1}$ | SB=001 | 1 | 1 | 1 | 0 | 0 | 1 | HB=111 |
| 22 | $V0_{5-2}$ | SB=101 | 1 | 1 | 1 | 1 | 0 | 1 | HB=111 |
| 21 | $V0_{4+2}$ | SB=100 | 1 | 1 | 1 | 1 | 0 | 0 | HB=111 |
| 20 | $V0_{4+1}$ | SB=110 | 1 | 1 | 1 | 1 | 1 | 0 | HB=111 |
| 19 | $V0_4$ | SB=111 | 1 | 1 | 1 | 1 | 1 | 1 | HB=111 |
| 18 | $V0_{4-1}$ | SB=111 | 0 | 1 | 1 | 1 | 1 | 1 | HB=011 |
| 17 | $V0_{4-2}$ | SB=110 | 0 | 1 | 1 | 1 | 1 | 0 | HB=011 |
| 16 | $V0_{3+2}$ | SB=100 | 0 | 1 | 1 | 1 | 0 | 0 | HB=011 |
| 15 | $V0_{3+1}$ | SB=101 | 0 | 1 | 1 | 1 | 0 | 1 | HB=011 |
| 14 | $V0_3$ | SB=001 | 0 | 1 | 1 | 0 | 0 | 1 | HB=011 |
| 13 | $V0_{3-1}$ | SB=001 | 0 | 1 | 0 | 0 | 0 | 1 | HB=010 |
| 12 | $V0_{3-2}$ | SB=101 | 0 | 1 | 0 | 1 | 0 | 1 | HB=010 |
| 11 | $V0_{2+2}$ | SB=111 | 0 | 1 | 0 | 1 | 1 | 1 | HB=010 |
| 10 | $V0_{2+1}$ | SB=110 | 0 | 1 | 0 | 1 | 1 | 0 | HB=010 |
| 9 | $V0_2$ | SB=010 | 0 | 1 | 0 | 0 | 1 | 0 | HB=010 |
| 8 | $V0_{2-1}$ | SB=010 | 0 | 0 | 1 | 0 | 1 | 0 | HB=001 |
| 7 | $V0_{2-2}$ | SB=110 | 0 | 0 | 1 | 1 | 1 | 0 | HB=001 |
| 6 | $V0_{1+2}$ | SB=111 | 0 | 0 | 1 | 1 | 1 | 1 | HB=001 |
| 5 | $V0_{1+1}$ | SB=101 | 0 | 0 | 1 | 1 | 0 | 1 | HB=001 |
| 4 | $V0_1$ | SB=001 | 0 | 0 | 1 | 0 | 0 | 1 | HB=001 |
| 3 | $V0_{1-1}$ | SB=001 | 0 | 0 | 0 | 0 | 0 | 1 | HB=000 |
| 2 | $V0_{1-2}$ | SB=101 | 0 | 0 | 0 | 1 | 0 | 1 | HB=000 |
| 1 | | SB=111 | 0 | 0 | 0 | 1 | 1 | 1 | HB=000 |

Fig. 7B

| Transmitted Bits | | | | | | Np | |  |
|---|---|---|---|---|---|---|---|---|
| HB1 | HB2 | HB3 | SB1 | SB2 | SB3 | | | |
| 0 | 0 | 0 | 1 | 1 | 1 | 3 | <-row 1 | |
| 0 | 0 | 0 | 1 | 0 | 1 | 3 | <-row 2 | |
| 0 | 0 | 0 | 0 | 0 | 1 | 3 | <-row 3 | |
| 0 | 0 | 1 | 0 | 0 | 1 | 3 | <-row 4 | |
| 0 | 0 | 1 | 1 | 0 | 1 | 3 | <-row 5 | |
| 0 | 0 | 1 | 1 | 1 | 1 | 2 | <-row 6 | |
| 0 | 0 | 1 | 1 | 1 | 0 | 1 | <-row 7 | |
| 0 | 0 | 1 | 0 | 1 | 0 | 0 | <-row 8 | lowest P{1HB, 0SB} |
| 0 | 1 | 0 | 0 | 1 | 0 | 0 | <-row 9 | lowest P{1HB, 0SB} |
| 0 | 1 | 0 | 1 | 1 | 0 | 2 | <-row 10 | |
| 0 | 1 | 0 | 1 | 1 | 1 | 3 | <-row 11 | |
| 0 | 1 | 0 | 1 | 0 | 1 | 3 | <-row 12 | |
| 0 | 1 | 0 | 0 | 0 | 1 | 3 | <-row 13 | |
| 0 | 1 | 1 | 0 | 0 | 1 | 3 | <-row 14 | |
| 0 | 1 | 1 | 1 | 0 | 1 | 3 | <-row 15 | |
| 0 | 1 | 1 | 1 | 0 | 0 | 1 | <-row 16 | |
| 0 | 1 | 1 | 1 | 1 | 0 | 3 | <-row 17 | |
| 0 | 1 | 1 | 1 | 1 | 1 | 3 | <-row 18 | |
| 1 | 1 | 1 | 1 | 1 | 1 | 2 | <-row 19 | |
| 1 | 1 | 1 | 1 | 1 | 0 | 2 | <-row 20 | |
| 1 | 1 | 1 | 1 | 0 | 0 | 3 | <-row 21 | |
| 1 | 1 | 1 | 1 | 0 | 1 | 3 | <-row 22 | |
| 1 | 1 | 1 | 0 | 0 | 1 | 3 | <-row 23 | |
| 1 | 1 | 0 | 0 | 0 | 1 | 3 | <-row 24 | |
| 1 | 1 | 0 | 1 | 0 | 1 | 3 | <-row 25 | |
| 1 | 1 | 0 | 1 | 0 | 0 | 2 | <-row 26 | |
| 1 | 1 | 0 | 1 | 1 | 0 | 3 | <-row 27 | |
| 1 | 1 | 0 | 1 | 1 | 1 | 3 | <-row 28 | |
| 1 | 0 | 0 | 1 | 1 | 1 | 2 | <-row 29 | |
| 1 | 0 | 0 | 1 | 1 | 0 | 1 | <-row 30 | |
| 1 | 0 | 0 | 1 | 0 | 0 | 2 | <-row 31 | |
| 1 | 0 | 0 | 1 | 0 | 1 | 3 | <-row 32 | |
| 1 | 0 | 0 | 0 | 0 | 1 | 3 | <-row 33 | |
| 1 | 0 | 1 | 0 | 0 | 1 | 3 | <-row 34 | |
| 1 | 0 | 1 | 1 | 0 | 1 | 3 | <-row 35 | |
| 1 | 0 | 1 | 1 | 0 | 0 | 2 | <-row 36 | |

BIT STREAM ALIASING IN MEMORY SYSTEM WITH PROBABILISTIC DECODING

BACKGROUND

In conventional memory devices, an error correction code (ECC) decoder assumes that no transmission errors occur during transmission of a bit stream arriving at the ECC decoder from a memory during a read operation. However, as technology progresses, a data transmission channel extending from the memory to the ECC decoder can become faster, smaller, and/or longer, thereby increasing a potential for data errors during transmission of a bit stream of read data over the data transmission channel. If an error is introduced during transmission of the bit stream of read data from the memory to the ECC decoder, the ECC decoder may inadvertently generate an incorrect final read data output, which can cause operational failure on a host computer system. It is within this context that the present invention arises.

SUMMARY

In one embodiment, a system is disclosed for bit stream aliasing in a memory system. The system includes an aliasing module defined and connected to receive a first bit stream to be transmitted over a data bus from a memory to an external controller of the memory. The aliasing module is defined and connected to alias the first bit stream as a second bit stream and transmit the second bit stream over the data bus in lieu of the first bit stream. The system also includes a de-aliasing module defined and connected to receive the second bit stream from the data bus at the external controller. The de-aliasing module is defined and connected to de-alias the received second bit stream back to the first bit stream and provide the first bit stream to the external controller for processing.

In one embodiment, a memory system is disclosed. The memory system includes a memory array and a data register defined and connected to receive and store a first bit stream from the memory array. The memory system also includes an aliasing module defined and connected to receive the first bit stream from the data register and alias the first bit stream as a second bit stream. The aliasing module is defined and connected to transmit the second bit stream in lieu of the first bit stream. The memory system also includes a data bus connected to receive the second bit stream transmitted from the aliasing module. The memory system further includes a de-aliasing module connected to receive the second bit stream transmitted over the data bus from the aliasing module and de-alias the second bit stream back to the first bit stream. The memory system also includes an external controller including an error correction code decoder connected to receive the first bit stream from the de-aliasing module.

In one embodiment, a method is disclosed for operating a memory system. The method includes reading a first bit stream from a storage element in a memory array. The method also includes aliasing the first bit stream as a second bit stream, and transmitting the second bit stream over a data bus to an external memory controller in lieu of the first bit stream. The method further includes de-aliasing the second bit stream back to the first bit stream upon arrival of the second bit stream at the external memory controller. The method also includes providing the first bit stream to an error correction code decoder at the external memory controller.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 6B shows a probability chart of transmitted bit stream versus received bit stream for a reading operation from the storage element operated according to the sensing chart of FIG. 6A, in accordance with one embodiment of the present invention.

FIG. 7A shows an example hard bit (HB) and soft bit (SB) sensing chart for a storage element within the memory array that stores eight bits of data, in accordance with one embodiment of the present invention.

FIG. 7B shows a probability chart of transmitted bit stream versus received bit stream for a reading operation from the storage element operated according to the sensing chart of FIG. 7A, in accordance with one embodiment of the present invention.

FIG. 7C shows a chart of the total probability ($P\{1HB, 0SB\}$) of having a single hard bit error with no soft bit errors for each transmitted bit stream, i.e., for each row, in accordance with one embodiment of the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
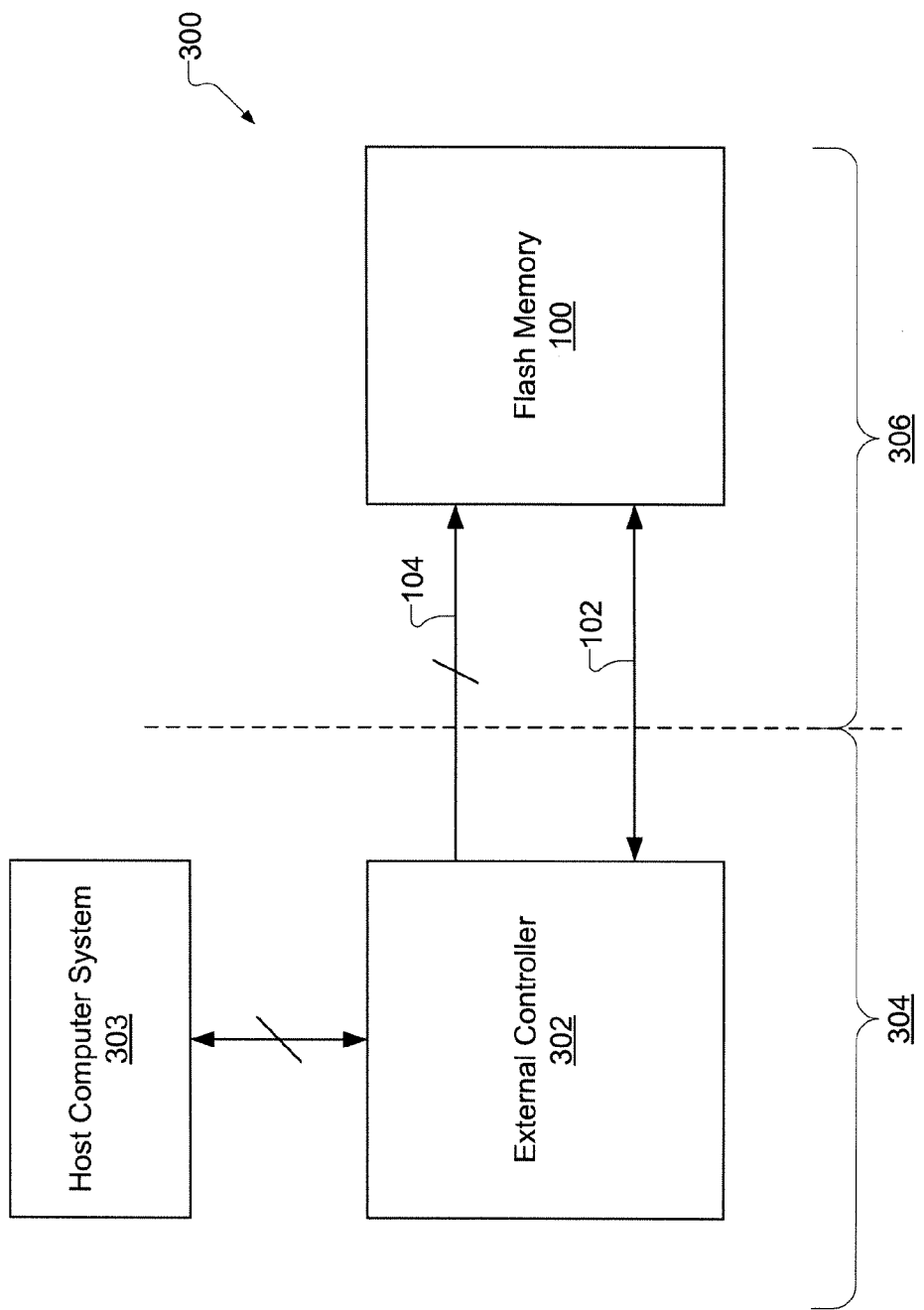
FIG. 1 is a high-level schematic block diagram of a flash memory device in which a flash memory is controlled by an external controller, in accordance with one embodiment of the present invention.

FIG. 1 is a high-level schematic block diagram of a flash memory device 300 in which a flash memory 100 is controlled by an external controller 302, in accordance with one embodiment of the present invention. The external controller 302 is defined to be electronically connected to a host computer system 303, such as a personal computer, a digital camera, a personal digital assistant, or essentially any other type of computer device that includes a digital processor. The host computer system 303 transmits commands to the external controller 302, such as commands to write data to or read data from the flash memory 100. The host computer system 303 also provides data to be written to, i.e., stored in, the memory 100 to the external controller 302, and receives data read from the memory 100 from the external controller 302. The external controller 302 is defined to generate and transmit command signals 104 to the flash memory 100, such that the command signals 104 can be interpreted and executed by the flash memory 100. The external controller 302 is also defined to transmit data to the flash memory over an I/O (input/output) bus 102 for storage within the flash memory 100, and receive read data over the I/O bus 102 from the flash memory 100. The external controller 302 can include a buffer memory for temporary storage of data being written to or read from the flash memory 100.

In one embodiment, the memory device 300 includes one integrated circuit chip 304 that includes the external controller 302, and one or more integrated circuit chips 306 that include the flash memory 100. In one embodiment, the flash memory 100 is defined on a single integrated circuit chip. However, it should be understood that in other embodiments, the flash memory 100 can be defined across multiple integrated circuit chips that are each connected to electronically communicate with the external controller 302. Also, it should be understood that the memory device 300 may be embedded as part of the host computer system 303, or may be included in a memory card that is removably insertable into a mating socket of the host computer system 303. Such a memory card may include the entire memory device 300, or portions of the memory device 300, with a remainder of the memory device 300 defined on other components interfaced with the host computer system and/or memory card.

Figure 2:
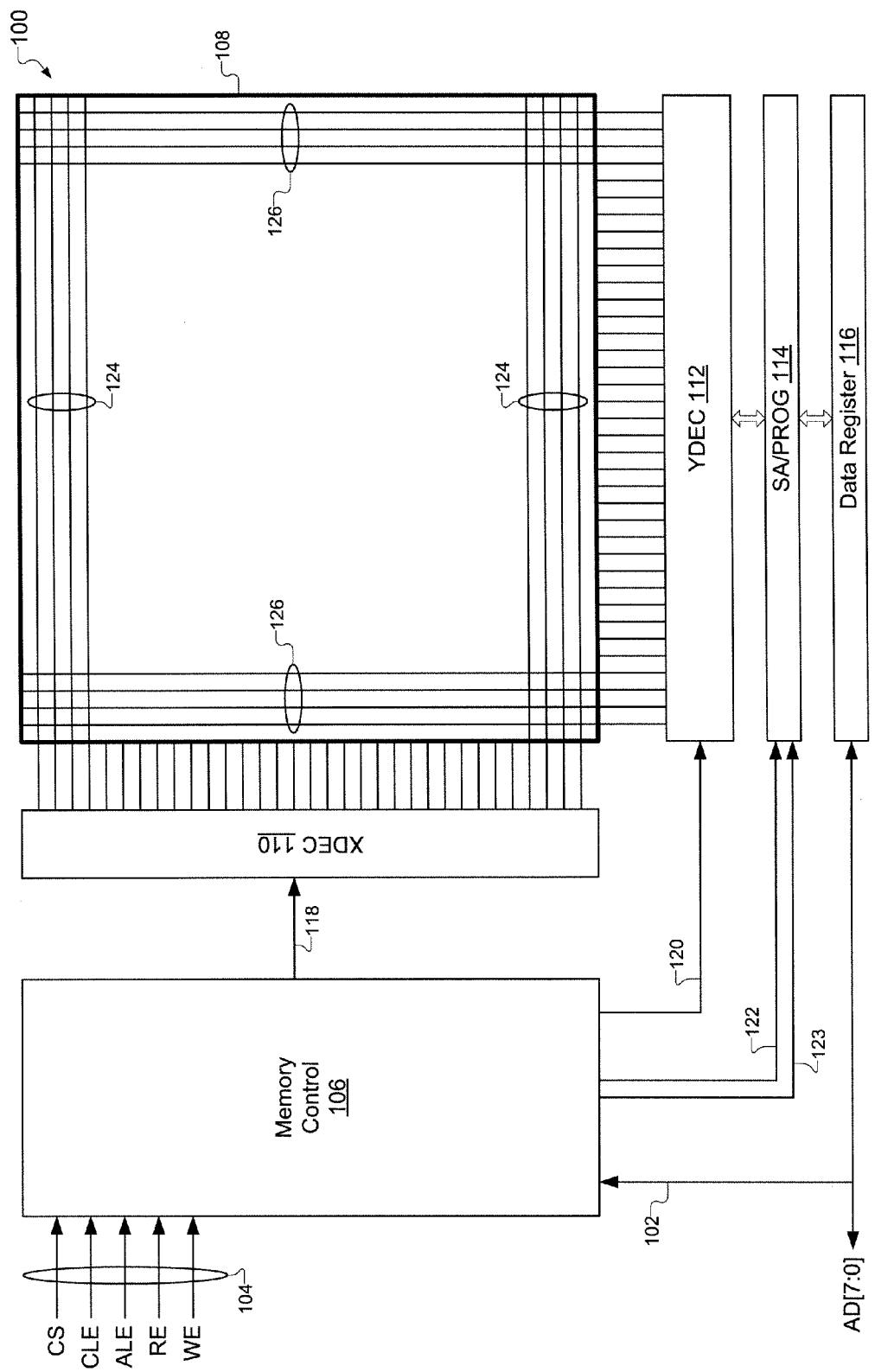
FIG. 2 shows an exemplary internal architecture for the flash memory, in accordance with one embodiment of the present invention.

FIG. 2 shows an exemplary internal architecture for the flash memory 100, in accordance with one embodiment of the present invention. The flash memory 100 includes a memory control circuit 106 defined to control internal memory operations. The memory control circuit 106 includes registers for command, address and status signals. The memory control circuit 106 is connected to receive signals on an input/output (I/O) bus 102 and to receive control signals 104 from the external controller 302. The flash memory 100 includes one or more arrays 108 of storage elements. In one embodiment, the storage elements within the array 108 are defined as flash EEPROM cells. Each array 108 storage element has an associated row decoder (XDEC) 110, an associated column decoder (YDEC) 112, an associated group of sense amplifiers and program control circuitry (SA/PROG) 114, and an associated data register 116.

In one embodiment, the array 108 of storage elements includes one or more conductive floating gates as storage elements. However, in other embodiments, the array 108 of storage elements includes other types of long-term electron charge storage elements. In one embodiment, the array 108 of storage elements can be operated with two levels of charge defined for each storage element, so as to store one bit of data with each storage element. In other embodiments, more than two storage states may be defined for each storage element in the array 108, such that more than one bit of data can be stored in each storage element.

In one embodiment, the control signals 104 include:
CS: Chip Select Signal: The CS signal is used to activate the flash memory 100 interface. If the CS signal is not asserted, the flash memory 100 will remain in standby mode and will not respond to other control signals.
CLE: Command Latch Enable Signal: The CLE signal controls the activating path for commands sent to the command register of the memory control circuit 106. When the CLE signal is asserted, commands are latched into the command register of the memory control circuit 106.
ALE: Address Latch Enable Signal: The ALE signal controls the activating path for addresses sent to the address register of the memory control circuit 106. When the ALE signal is asserted, addresses are latched into the address register of the memory control circuit 106.
RE: Read Enable Signal: The RE signal enables the data output buffers. When the RE signal is asserted, the read data is driven onto I/O bus 102.
WE: Write Enable Signal: The WE signal controls writing of data to the I/O port. Assertion of the WE signal provides for clocking of data, addresses, and/or commands into the flash memory 100.
AD[7:0]: Data on I/O bus 102: The I/O bus 102 is used to transfer data between a data bus controller and the flash memory 100 command, address, and data registers of the memory control circuit 106.

In addition to the above-mentioned control signals 104, the memory 100 also includes a means by which a storage subsystem controller may determine that the memory 100 is busy performing some task. Such means could include a dedicated signal or a status bit in an internal memory register that is accessible while the memory 100 is busy. It should be understood that the control interface defined by the above-mentioned control signals 104 is provided by way of example. In other embodiments, the control interface may include signals other than those discussed above to provide equivalent or expanded control of the memory 100. Additionally, it should be understood that while the example embodiment of FIG. 2 shows one flash memory array 108 with its associated components, other embodiments can include multiple arrays 108 as part of a given flash memory 100, where the multiple arrays 108 share a common interface 104 and memory control circuit 106, but have separate respective XDEC 110, YDEC 112, SA/PROG 14, and data register 116 circuitry in order to allow parallel read and program, i.e., write, operations.

During a read operation, data is transferred from the memory array 108 through the data register 116 to an external controller via the I/O bus 102. Data register 116 is also electrically connected to the SA/PROG (sense amplifier/programming) circuit 114. The number of storage elements of data register 116 that are connected to each SA/PROG circuit 114 element may depend on the number of bits stored in each storage element of the array 108. The SA/PROG circuit 114 is connected to a sense enable line 122 that when activated causes the SA/PROG circuit 114 to operate in a sense mode. Also, the SA/PROG circuit 114 is connected to a program enable line 123 that when activated causes the SA/PROG circuit 114 to operate in a program/verify mode.

Each storage element of the array 108 can have one or more floating gates. In one embodiment, the storage elements of the array 108 are multi-level storage elements, with each storage element capable of storing multiple bits of binary data, such as two bits or four bits, by way of example. In another embodiment, the storage elements of the array 108 are single-level storage elements, with each storage element capable of storing one bit of binary data.

The rows 124 of array 108 correspond to word lines. The columns 126 of array 108 correspond to bit lines. To avoid unnecessarily obscuring the array 108 of FIG. 2, only the first and last four rows 124 (word lines), and only the first and last four columns 126 (bit lines) are explicitly shown. However, it should be understood that the actual number of rows 124 (word lines) and columns 126 (bit lines) in the array 108 is dependent on the number of storage elements in the array 108, with each storage element have one row 124 (word line) and two columns 126 (bit lines).

The row decoder XDEC 110 is defined to decode row addresses for array 108 in order to select the physical page to be accessed. The row decoder XDEC 110 receives row addresses via internal row address lines 118 from the memory control circuit 106. The column decoder YDEC 112 receives column addresses via internal column address lines 120 from the memory control circuit 106. A storage element is positioned in the array 108 at each intersection of the rows 124 (word lines) and the columns 126 (bit lines).

Figure 3:
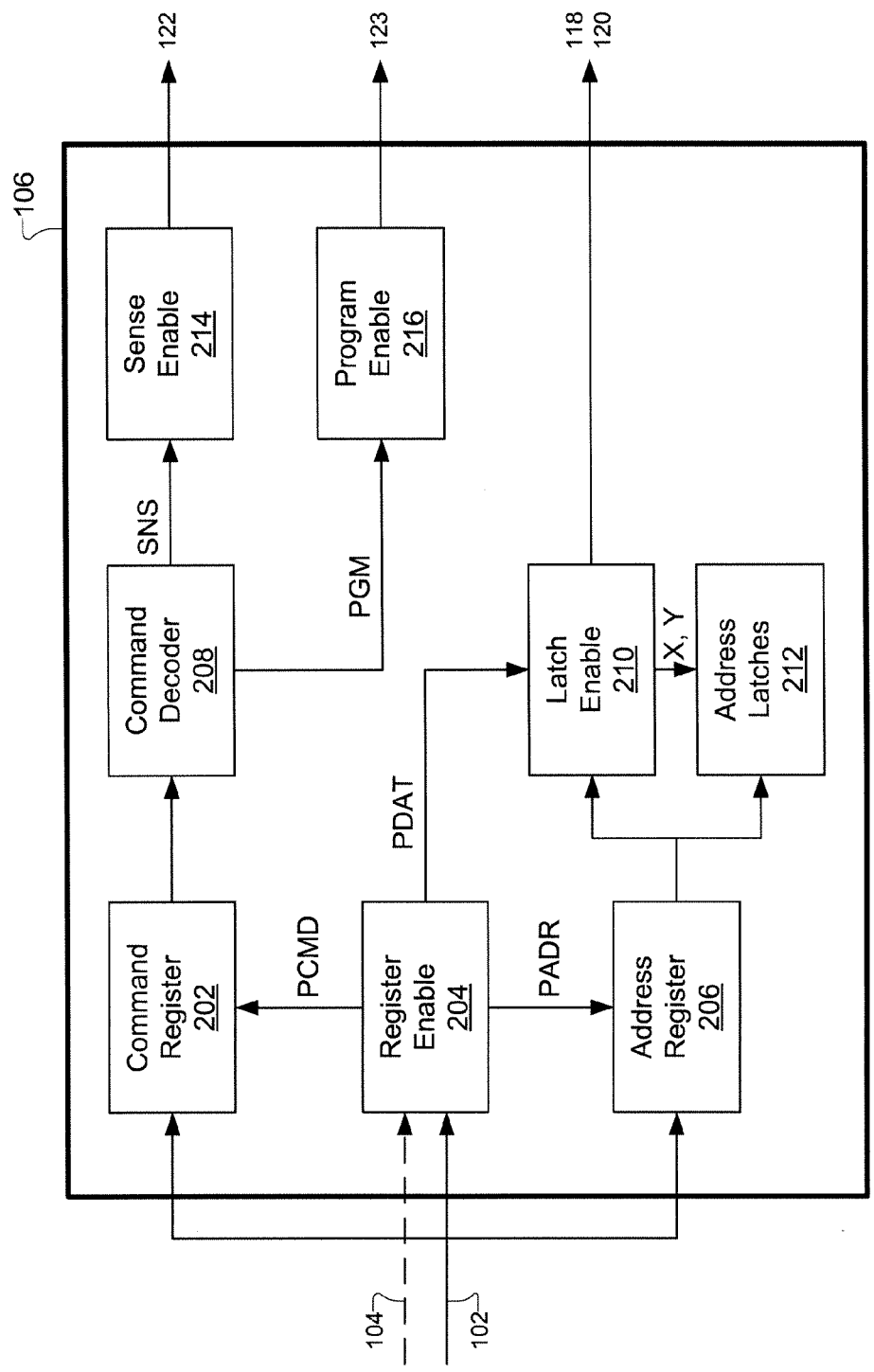
FIG. 3 shows a simplified block diagram of the memory control circuit, in accordance with one embodiment of the present invention.

FIG. 3 shows a simplified block diagram of the memory control circuit 106, in accordance with one embodiment of the present invention. The memory control circuit 106 includes a register enable circuit 204 that has outputs coupled to an address register 206, a command register 202 and a latch enable circuit 210, respectively. Upon receiving from the external controller an ALE control signal 104 indicating that an address descriptor is to follow, the register enable circuit 204 activates an enable line PADR (physical address register), which causes a subsequent chunk address descriptor received from the external controller over I/O bus 102 to be latched in to address register 206. The latch enable circuit 210, which is connected to the address register 206, then activates latch enable lines X and Y to latch the chunk address stored in address register 206 into appropriate row and column latches of address latches 212. The chunk addresses stored in address latches 212 are then provided over appropriate lines of internal row address lines 118 to row decoder XDEC 110, and over internal column address lines 120 to column decoder YDEC 112.

Upon receiving from the external controller a control signal 104 that indicates that data is to follow, i.e., that data is to be written into the memory array 108, the register enable circuit 204 activates an enable line PDAT (program data signal) that causes a chunk of data received over I/O bus 102 to be latched into the data register 116. Upon receiving from the external controller a CLE control signal 104 that indicates that a command is to follow, the register enable circuit 204 activates an enable line PCMD (program command), which causes a subsequent read or write command received from the external controller over I/O bus 102 to be latched into the command register 202.

A command decoder 208 then reads the command stored in command register 202. If the command is a write command, the command decoder 208 decodes the command to activate a program line PGM connected to a program enable circuit 216. The program enable circuit 216 receives the activate signal on the program line PGM and the most significant bit from the chunk address stored in address register 206. Then, the program enable circuit 216 transmits signals over the program enable lines 123 to the SA/PROG circuit 114, directing the SA/PROG circuit 114 to selectively activate its program/verify mode of operation to program the data in data register 116 into memory array 108.

If the command is a read command, the command decoder 208 decodes the command to activate a sense line SNS connected to a sense enable circuit 214 that in turn transmits signals over the sense enable line 122 to direct the SA/PROG circuit 114 to selectively activate its sense mode of operation to sense the threshold voltages stored in the storage elements at the intersections of the latched row 124 (word line) and the latched columns 126 (bit lines) of memory array 108. The results of the sensing are loaded into data register 116, for subsequent reading by the external controller.

During a read operation, the external controller 302 transmits control signals 104 to the memory control circuit 106 to direct hard bits and soft bits corresponding to a specific address in the memory array 108, i.e., corresponding to a specific storage element or set of storage elements, to be sensed by the SA/PROG circuit 114 and stored in the data register 116. Then, the hard and soft bits stored in the data register 116 are transmitted over the I/O bus 102 to the external controller 302 as a bit stream. In one embodiment, the external controller is defined to perform error correction decoding and/or other functions on the hard and soft bits received in the bit stream from the data register 116.

During a read operation, hard bits and soft bits are generated through sensing of the addressed storage elements within the array 108. These hard and soft bits are transmitted as a bit stream from the data register 116 to an error correction code (ECC) decoder within the external controller 302. The ECC decoder is defined to detect and correct errors in the bit stream of hard and soft bits and generate a corrected final read data output.

A flash memory that stores one bit of data per storage element is referred to as single-level cell (SLC) memory. A flash memory that stores more than one bit of data per storage element is referred to as a multi-level cell (MLC) memory. In the flash memory 100, each storage element within the array 108 includes a transistor having both a control gate and a floating gate. When data is written to the storage element, electrons are injected into the floating gate of the storage element's transistor. The injected electrons oppose a reference voltage applied to the control gate. The transistor of the storage element does not turn on, i.e., conduct, unless the reference voltage applied to its control gate is sufficiently high to overcome a charge present on its floating gate. The lowest voltage that can be applied to the control gate to overcome the charge on the floating gate is referred to as the threshold voltage of the transistor of the storage element.

The threshold voltage of a storage element resides within a voltage range extending from a minimum voltage ($V_{min}$) to a maximum voltage ($V_{max}$). The threshold voltage range of the storage element is divided into a number of voltage bins, where each voltage bin corresponds to a particular bit pattern stored in the storage element. A threshold voltage set within a particular voltage bin represents storage of a bit pattern that uniquely corresponds to the particular voltage bin. Therefore, the number of bits that can be stored by a given storage element is dependent upon the number of voltage bins into which the threshold voltage range is divided. More specifically, the threshold voltage range of a storage element that stores n bits is divided into $2^n$ voltage bins.

During a write operation, voltage pulses are applied to the transistor of the storage element to inject electrons into the floating gate of the storage element's transistor until a threshold voltage is established within the transistor of the storage element that exceeds a verify voltage level associated with a particular bit pattern to be stored within the storage element. During a read operation, the sensed threshold voltage of the storage element is compared to reference voltage levels that define the boundaries of the voltage bins into which the threshold voltage range is divided so as to identify the voltage bin in which the sensed threshold voltage resides, which in turn identifies the bit pattern stored in the storage element.

In one embodiment, the threshold voltage range of a storage element, i.e., the voltage range from $V_{min}$ to $V_{max}$, is divided into a number (x) of primary voltage bins by a number (x−1) of primary reference voltages. It should be understood that the voltages $V_{min}$ and $V_{max}$ do not represent primary reference voltages. For ease of description, the voltages $V_{min}$ and $V_{max}$ may be considered to represent −infinity and +infinity, respectively. Each data bit or bit pattern that is uniquely assigned to each primary voltage bin is referred to as a hard bit (HB) or HB pattern. In some embodiments, each primary voltage bin as delineated by the primary reference voltages can be further divided into a number (y) of voltage sub-bins by a number of (y−1) of secondary reference voltages. Each voltage sub-bin within a given primary voltage bin is assigned a unique soft bit (SB) or SB pattern, depending on the number of soft bits required to uniquely identify each voltage sub-bin corresponding to the given primary voltage bin. In this manner, the soft bits (SBs) can provide information as to where the sensed threshold voltage of the storage element resides within the given primary voltage bin. The soft bits (SBs) can be used by the ECC decoder within the external controller 302 to implement a decoding algorithm and assist in identifying which hard bits (HBs) as received over the I/O bus 102 need correction, and how they should be corrected.

Figures 4A, 4B:
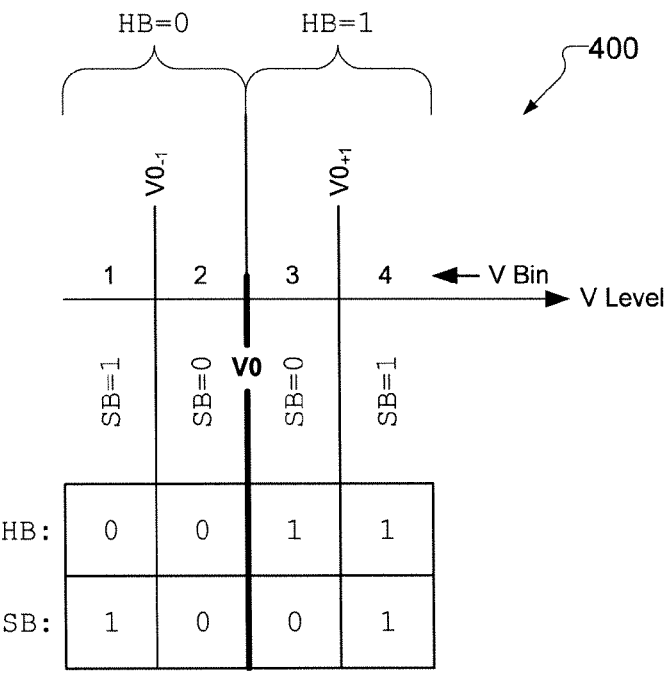
FIG. 4A shows an example hard bit (HB) and soft bit (SB) sensing chart for a storage element within the memory array that stores one bit of data and implements two voltage sub-bins per primary voltage bin, in accordance with one embodiment of the present invention.
FIG. 4B shows a probability chart of transmitted bit stream versus received bit stream for a reading operation from the storage element operated according to the sensing chart of FIG. 4A, in accordance with one embodiment of the present invention.

FIG. 4A shows an example hard bit (HB) and soft bit (SB) sensing chart 400 for a storage element within the memory array 108 that stores one bit of data and implements two voltage sub-bins per primary voltage bin, in accordance with one embodiment of the present invention. The threshold voltage range of the storage element represented by the sensing chart 400 is divided into two primary voltage bins by a single primary reference voltage (V0). The first primary voltage bin corresponds to a hard bit value 0 (HB=0). The second primary voltage bin corresponds to a hard bit value 1 (HB=1). The first primary voltage bin (HB=0) is divided into two voltage sub-bins 1 and 2 by a secondary reference voltage (V$0_{-1}$), where voltage sub-bins 1 and 2 are assigned soft bits 1 and 0, respectively. The second primary voltage bin (HB=1) is divided into two voltage sub-bins 3 and 4 by a secondary reference voltage (V$0_{+1}$), where voltage sub-bins 3 and 4 are assigned soft bits 0 and 1, respectively. The voltage sub-bins 1-4 correspond to increasing threshold voltage level.

During a read operation of the storage element represented by the sending chart 400, the threshold voltage of the storage element is sensed and the voltage sub-bin in which the threshold voltage resides is identified. With reference to FIG. 1, the hard bit and soft bit corresponding to the voltage sub-bin in which the sensed threshold voltage resides is transmitted from the data register 116 of the memory 100 to the ECC decoder of the external controller 302. For example, if the sensed threshold voltage reside within voltage sub-bin 1, the bit stream 01 (corresponding to HB=0, SB=1) is transmitted from the data register 116 of the memory 100 to the ECC decoder of the external controller 302. The ECC decoder then functions to use the received HB/SB bit stream to determine which primary voltage bin includes the sensed threshold voltage of the storage element, and thereby what data is stored in the storage element.

In conventional memory devices, the ECC decoder assumes that no transmission errors occur during transmission of the bit stream of hard and soft bits from the data register 116 to the ECC decoder within the external controller 302. However, as technology progresses, the data transmission channel, e.g., I/O bus 102, extending from the data register 116 within the memory 100 to the ECC decoder within the external controller 302 can become faster, smaller, and/or longer, thereby increasing a potential for data errors during transmission of the bit stream of hard and soft bits over the data transmission channel. It should be appreciated that if an error is introduced during transmission of the hard and soft bits from the memory 100 to the external controller 302, the ECC decoder may inadvertently generate an incorrect final read data output, which can cause operational failure on the host computer system 303.

FIG. 4B shows a probability chart 401 of transmitted bit stream versus received bit stream for a reading operation from the storage element operated according to the sensing chart 400 of FIG. 4A, in accordance with one embodiment of the present invention. In the probability chart 401, the sequence of transmitted bit streams as ordered from top to bottom of the chart 401 matches the sequence of received bit streams as ordered from left to right of the chart 401, which corresponds to the possible transmitted bit streams as a function of increasing sensed threshold voltage level. Thus, a diagonal series of cells extending from the top-left to the bottom-right of the chart corresponds to error free transmission of the bit stream from the data register 116 of the memory 100 to the ECC decoder of the external controller 302. Each cell within the chart 401 shows a probability of obtaining the corresponding received bit stream from the corresponding transmitted bit stream.

A probability of having a single bit in error during transmission of a bit stream from the data register 116 of the memory 100 to the ECC decoder of the external controller 302, i.e., a bit-error probability, is represented by p. For example, for transmission of the bit stream 01 from the data register 116, the probability of receiving bit stream 00 at the ECC decoder corresponds to p, because one bit, i.e., the second bit, is in error. Also, a total probability of error for a given received bit stream is equal to a product of the bit-error probabilities for the given received bit stream. For example, for transmission of the bit stream 01 from the data register 116, the probability of receiving bit stream 10 at the ECC decoder corresponds to $p^2$, because both bits, i.e., two bits, are in error. Therefore, the probability of receiving an incorrect bit stream is equal to $p^z$, where z is the number of bits in error in the received bit stream. Also, the probability of having a correctly received bit stream is one minus a sum of the probabilities of occurrence of all incorrectly received bit streams. For example, in the chart 401, each cell in the diagonal series of cells corresponding to error free transmission of the bit stream shows a probability of occurrence of $1-2p-p^2$.

Some transmitted bit streams have a higher reliability of being received and successfully decoded by the ECC decoder than others. For example, in one embodiment, a monotonic behavior in received bit stream error probability for a given transmitted bit stream within the probability chart 401 will correspond to a more reliable decoding of the transmitted bit stream by the ECC decoder. For instance, the received bit stream error probability for the transmitted bit stream 00 in the probability chart 401 exhibits monotonic behavior about the correctly received bit stream 00. Specifically, the probability of receiving bit stream 11 is $p^2$, which is less than the probability of receiving bit stream 10. Thus, this is a favorable received bit stream error behavior for the ECC decoding function.

In contrast, the received bit stream error probability for the transmitted bit stream 01 in the probability chart 401 exhibits non-monotonic behavior about the correctly received bit stream 01. Specifically, the probability of receiving bit stream 11 is p, which is greater than the probability $p^2$ of receiving bit stream 10, which is less than the probability p of receiving bit stream 00. Because the voltage corresponding to the voltage sub-bin associated with received bit pattern 11 is greater than the voltage corresponding to the voltage sub-bin associated with received bit pattern 10, the received bit stream error behavior is not monotonic relative to sensed threshold voltage level, which is not favorable for the ECC decoding function.

Generally speaking, it is not possible to assign the hard bits and soft bits to the various primary voltage bins and voltage sub-bins, respectively, to obtain a completely well-behaved probability chart for all transmitted bit streams versus received bit streams. That is to say, there will always be some transmitted bit streams that have more undesirable behavior with regard to their corresponding received bit stream probability of occurrence. These bit streams are referred to hereafter as less reliably decoded bit streams. And, in a complementary manner there will be some transmitted bit streams that have more preferred behavior with regard to their corresponding received bit stream probability of occurrence. These bit streams are referred to hereafter as more reliably decoded bit streams.

In one embodiment, there may be one or more bit streams that are transmitted over the I/O bus 102 more frequently than other bit streams during memory 100 read operations. In this embodiment, it is desirable that those more frequently transmitted bit streams be the more reliably decoded bit streams. To this end, in accordance with one embodiment of the present invention, a more frequently transmitted bit stream that is less reliably decoded is aliased at the output of the memory 100, prior to transmission over the I/O bus 102, to another transmitted bit stream that is more reliably decoded. Then, upon arrival at the external controller 302, the aliased transmitted bit stream is de-aliased to its original bit stream representation.

For example, with regard to FIG. 4B, consider that the transmitted bit stream 01 is more frequently transmitted than the bit stream 00. Also, note that the more frequently transmitted bit stream 00 is less reliably decoded given the non-monotonic behavior of its received bit stream as a function of the sensed threshold voltage level. Also, note that the transmitted bit stream 00 is more reliably decoded given the monotonic behavior of its received bit stream as a function of the sensed threshold voltage level. In this case, the transmitted bit stream 01 can be aliased to the bit stream 00 at the output of the memory 100 before transmission over the I/O bus 102. Correspondingly, the transmitted bit stream 00 would be aliased to the bit stream 01. In this manner, the more important bit stream 01 is transmitted over the I/O bus 102 in alias form as bit stream 00. Then, upon arriving at the external controller 302, the received bit stream 00 is de-aliased back to the bit stream 01 before processing by the ECC decoder. Therefore, the more important bit stream 01 will transmitted under the alias of the more reliably decoded bit stream. Further with regard to FIG. 4B, if the transmitted bit stream 11 is more important, e.g., more frequently transmitted, than the bit stream 10, the bit stream 11 can be transmitted under the alias of the more reliably transmitted bit stream 10, vice-versa.

Figure 5A:
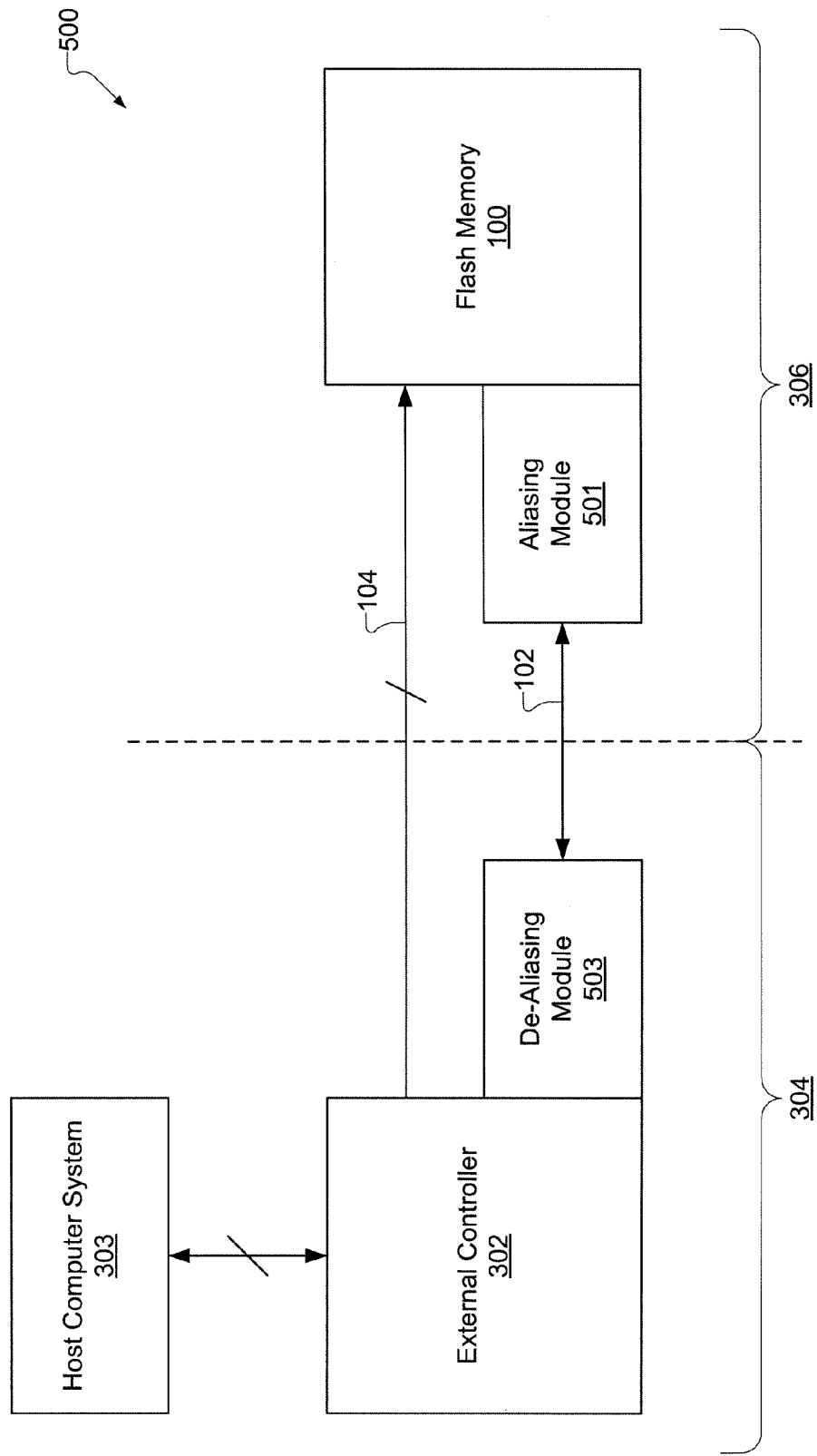
FIG. 5A shows a high-level schematic block diagram of a flash memory device in which an aliasing module and a de-aliasing module are implemented between the memory and external controller, in accordance with one embodiment of the present invention.

FIG. 5A shows a high-level schematic block diagram of a flash memory device 500 in which an aliasing module 501 and a de-aliasing module 503 are implemented between the memory 100 and external controller 302, in accordance with one embodiment of the present invention. The aliasing module 501 is defined and connected to alias a more important and less reliably decoded bit stream emanating from the data register 116 within the memory 100 to a more reliably decoded bit stream prior to transmission over the I/O bus 102. In a complementary manner, the de-aliasing module 503 is defined and connected to de-alias the bit stream received over the I/O bus 102 back to its original form prior to its submission to the ECC decoder within the external controller 302. The aliasing module 501 and de-aliasing module 503 are defined to operate in accordance with a common aliasing/de-aliasing algorithm, such that the de-aliasing module 503 is pre-defined/pre-programmed to undo the aliasing performed by the aliasing module 501.

Figure 5B:
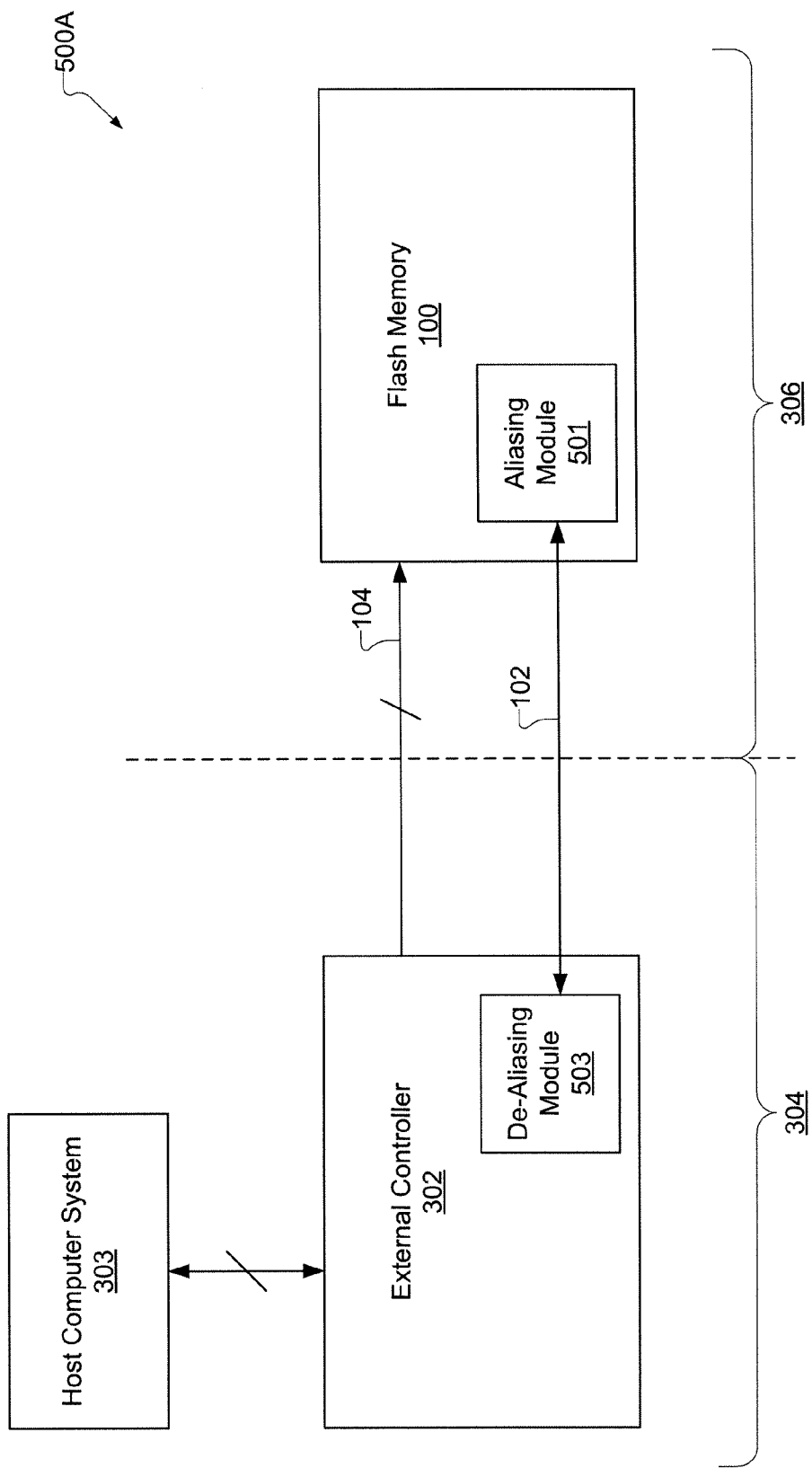
FIG. 5B shows a high-level schematic block diagram of the flash memory device in which the aliasing module is defined inside the memory, and in which the de-aliasing module is defined inside the external controller, in accordance with one embodiment of the present invention.

In one embodiment, the aliasing module 501 is defined outside of the memory 100 between the data register 116 and the I/O bus 102. In another embodiment, the aliasing module 501 is defined inside the memory 100, between the data register 116 and a connection to the I/O bus 102. Also, in one embodiment, the de-aliasing module 503 is defined outside of the external controller 302 between the ECC decoder and the I/O bus 102. In another embodiment, the de-aliasing module 503 is defined inside the external controller 302, between the ECC decoder and a connection to the I/O bus 102. Additionally, in one embodiment, the aliasing module 501 is defined outside the memory 100 between the data register 116 and the I/O bus 102, and the de-aliasing module 503 is defined inside the external controller 302, between the ECC decoder and a connection to the I/O bus 102. In yet another embodiment, the aliasing module 501 is defined inside the memory 100, between the data register 116 and a connection to the I/O bus 102, and the de-aliasing module 503 is defined outside of the external controller 302 between the ECC decoder and the I/O bus 102. FIG. 5B shows a high-level schematic block diagram of the flash memory device 500A in which the aliasing module 501 is defined inside the memory 100, and in which the de-aliasing module 503 is defined inside the external controller 302, in accordance with one embodiment of the present invention.

In one embodiment, the aliasing module 501 is defined to implement a prescribed bit stream aliasing specification in a hard-wired manner, such that the prescribed bit stream aliasing specification is automatically implemented for each bit stream transmitted from the data register 116 of the memory 100 onto the I/O bus 102. In another embodiment, the aliasing module 501 is defined as a programmable module in which a prescribed bit stream aliasing specification can be programmed and re-programmed as necessary. In this embodiment, the aliasing module 501 can be defined to include a persistent storage for retaining the programmed bit stream aliasing specification. It should be understood that in the above-mentioned embodiments, the prescribed bit stream aliasing specification dictates which bit streams are to be aliased for transmission and how those bit streams are to be aliased.

In one embodiment, the de-aliasing module 503 is defined to implement a prescribed bit stream de-aliasing specification in a hard-wired manner, such that the prescribed bit stream de-aliasing specification is automatically implemented for each bit stream received at the external controller 302 from the I/O bus 102. In another embodiment, the de-aliasing module 503 is defined as a programmable module in which a prescribed bit stream de-aliasing specification can be programmed and re-programmed as necessary. In this embodiment, the de-aliasing module 503 can be defined to include a persistent storage for retaining the programmed bit stream de-aliasing specification. It should be understood that in the above-mentioned embodiments, the prescribed bit stream de-aliasing specification dictates which bit streams are to be de-aliased upon receipt from the I/O bus 102 and how those bit streams are to be de-aliased. Also, it should be understood that regardless of how the aliasing module 501 and de-aliasing module 503 are implemented, i.e., in a hard-wired manner or a programmable manner, the aliasing module 501 and de-aliasing module 503 are each defined to implement complementary prescribed bit stream aliasing/de-aliasing specifications, such that any bit stream aliased by the aliasing module 501 will be correctly de-aliased by the de-aliasing module 503.

In one embodiment, both the aliasing module 501 and de-aliasing module 503 are defined as programmable modules in which prescribed bit stream aliasing and de-aliasing specifications can be respectively programmed and re-programmed as necessary. In this embodiment, the aliasing module 501 and de-aliasing module 503 can be operated in either of two modes, with the first mode being no aliasing/de-aliasing applied, and with the second mode applying a prescribed bit stream aliasing/de-aliasing specification.

Figure 6A:
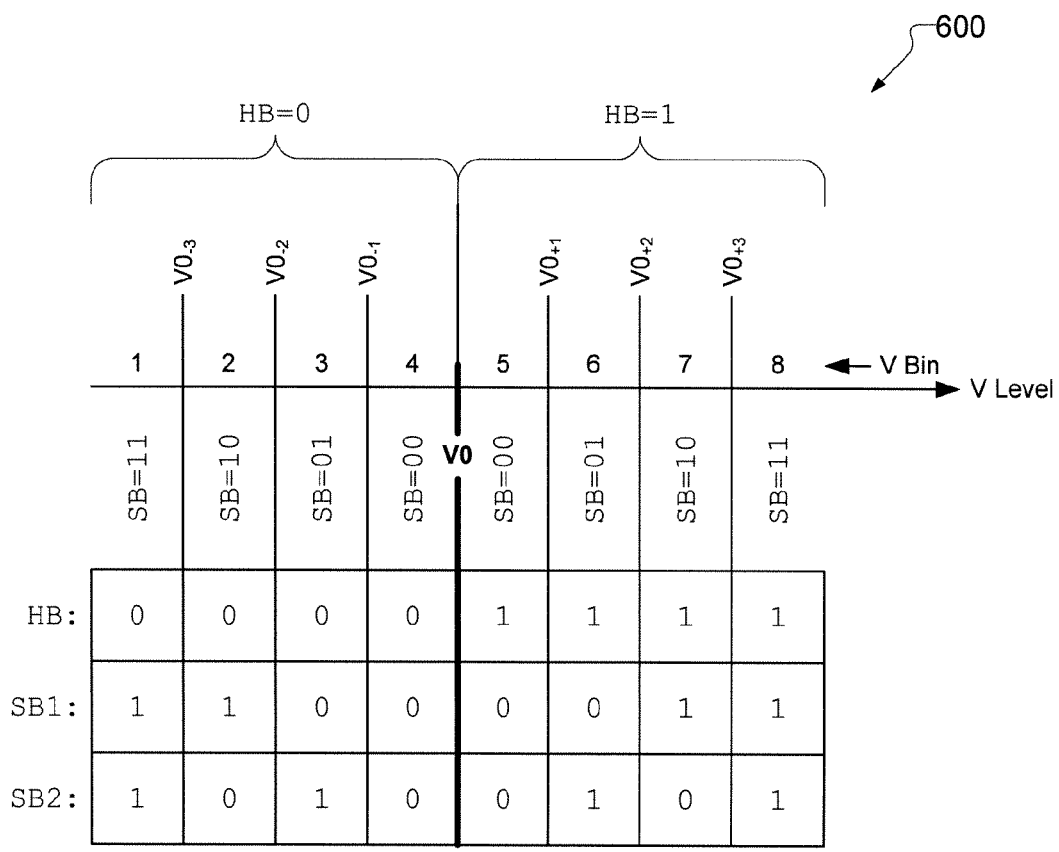
FIG. 6A shows an example hard bit (HB) and soft bit (SB) sensing chart for a storage element within the memory array that stores one bit of data and implements four voltage sub-bins per primary voltage bin, in accordance with one embodiment of the present invention.

It should be understood that the above-described bit stream aliasing and de-aliasing methods can be equally implemented with more advanced storage element operation. For example, FIG. 6A shows an example hard bit (HB) and soft bit (SB) sensing chart 600 for a storage element within the memory array 108 that stores one bit of data and implements four voltage sub-bins per primary voltage bin, in accordance with one embodiment of the present invention. The threshold voltage range of the storage element represented by the sensing chart 600 is divided into two primary voltage bins by a single primary reference voltage (V0). The first primary voltage bin corresponds to a hard bit value 0 (HB=0). The second primary voltage bin corresponds to a hard bit value 1 (HB=1). The first primary voltage bin (HB=0) is divided into four voltage sub-bins 1, 2, 3, 4 by secondary reference voltages ($V0_{-1}$, $V0_{-2}$, $V0_{-3}$). Voltage sub-bins 1, 2, 3, and 4 are assigned soft bits 11, 10, 01, and 00, respectively. The second primary voltage bin (HB=1) is divided into four voltage sub-bins 5, 6, 7, 8, 9 by secondary reference voltages ($V0_{+1}$, $V0_{+2}$, $V0_{+3}$). Voltage sub-bins 5, 6, 7, and 8 are assigned soft bits 00, 01, 10, and 11, respectively. The voltage sub-bins 1-8 correspond to increasing threshold voltage level.

During a read operation of the storage element represented by the sensing chart 600, the threshold voltage of the storage element is sensed and the voltage sub-bin in which the threshold voltage resides is identified. The hard bit and soft bits corresponding to the voltage sub-bin in which the sensed threshold voltage resides is transmitted from the data register 116 of the memory 100 to the ECC decoder of the external controller 302. For example, if the sensed threshold voltage resides within voltage sub-bin 3, the bit stream 001 (corresponding to HB=0, SB=01) is transmitted from the data register 116 of the memory 100 to the ECC decoder of the external controller 302. The ECC decoder then functions to use the received HB/SB bit stream to determine which primary voltage bin includes the sensed threshold voltage of the storage element, and thereby what data is stored in the storage element.

FIG. 6B shows a probability chart 601 of transmitted bit stream versus received bit stream for a reading operation from the storage element operated according to the sensing chart 600 of FIG. 6A, in accordance with one embodiment of the present invention. In the probability chart 601, the sequence of transmitted bit streams as ordered from top to bottom of the chart 601 matches the sequence of received bit streams as ordered from left to right of the chart 601, which corresponds to the possible transmitted bit streams as a function of increasing sensed threshold voltage level. Thus, a diagonal series of cells extending from the top-left to the bottom-right of the chart corresponds to error free transmission of the bit stream from the data register 116 of the memory 100 to the ECC decoder of the external controller 302. Each cell within the chart 601 shows a probability of obtaining the corresponding received bit stream from the corresponding transmitted bit stream.

As with the probability chart 401 of FIG. 4B, the bit-error probability is also represented by p in the probability chart 601. Also, the probability of receiving an incorrect bit stream is equal to $p^z$, where z is the number of bits in error in the received bit stream. And, the probability of having a correctly received bit stream is one minus a sum of the probabilities of occurrence of all incorrectly received bit streams. In the chart 601, each cell in the diagonal series of cells corresponding to error free transmission of the bit stream shows a probability of occurrence of $1-3p-3p^2-p^3$.

The probability chart 601 shows that the received bit stream error probability for each of the transmitted bit streams 000 and 100 exhibits monotonic behavior about its correctly received bit stream 000 and 100, respectively. In contrast, the received bit stream error probability for each of the other transmitted bit streams in the probability chart 601 exhibits non-monotonic behavior about its correctly received bit stream. Therefore, the transmitted bit streams 000 and 100 have more preferred behavior with regard to their corresponding received bit stream probability of occurrence, and are referred to as more reliably decoded bit streams. In the embodiment of FIGS. 6A-6B, the aliasing module 501 can be defined to alias a more frequently transmitted bit stream that is less reliably decoded to either bit stream 000 or 100, each of which is more reliably decoded. Correspondingly, the de-aliasing module 503 can be defined to de-alias the bit stream upon its arrival at the external controller 302.

In some embodiments, the more reliably decoded bit stream may exhibit monotonic behavior as discussed herein with regard to FIGS. 4A-4B and 6A-6B. In other embodiments, the more reliably decoded bit stream may satisfy criteria other than monotonic behavior of the received bit stream error probability. For example, in one embodiment, the more reliably decoded bit stream may correspond to a transmitted bit stream that maps to a lower number of received bit streams in which a probability of hard bit error is equal to a dominant probability term. Also, in one embodiment, a determination of which transmitted bit streams are more reliably decoded can depend on a complexity of the bit streams to be transmitted over the I/O bus 102.

FIG. 7A shows an example hard bit (FIB) and soft bit (SB) sensing chart 700 for a storage element within the memory array 108 that stores eight bits of data, in accordance with one embodiment of the present invention. The storage element represented by the sensing chart 700 of FIG. 7A implements three voltage sub-bins for the outer primary voltage bins (HB=000 and HB=101) and five voltage sub-bins for the inner primary voltage bins (HB=001, HB=010, HB=011, HB=111, HB=110, HB=100). The threshold voltage range of the storage element represented by the sensing chart 700 is divided into eight primary voltage bins by a seven primary reference voltages ($V0_1$, $V0_2$, $V0_3$, $V0_4$, $V0_5$, $V0_6$, $V0_7$). The eight primary voltage bins correspond to hard bit values HB=000, HB=001, HB=010, HB=011, HB=111, HB=110, HB=100, and HB=101, respectively.

The first primary voltage bin (HB=000) is divided into three voltage sub-bins 1, 2, and 3 by secondary reference voltages ($V0_{1-1}$ and $V0_{1-2}$). Voltage sub-bins 1, 2, and 3, are assigned soft bits 111, 101, and 001, respectively.

The second primary voltage bin (HB=001) is divided into five voltage sub-bins 4, 5, 6, 7, and 8 by secondary reference voltages ($V0_{1+1}$, $V0_{1+2}$, $V0_{2-1}$, and $V0_{2-2}$). Voltage sub-bins 4, 5, 6, 7, and 8 are assigned soft bits 001, 101, 111, 110, and 010, respectively.

The third primary voltage bin (HB=010) is divided into five voltage sub-bins 9, 10, 11, 12, and 13 by secondary reference voltages ($V0_{2+1}$, $V0_{2+2}$, $V0_{3-1}$, and $V0_{3-2}$). Voltage sub-bins 9, 10, 11, 12, and 13 are assigned soft bits 010, 110, 111, 101, and 001, respectively.

The fourth primary voltage bin (HB=011) is divided into five voltage sub-bins 14, 15, 16, 17, and 18 by secondary reference voltages ($V0_{3+1}$, $V0_{3+2}$, $V0_{4-1}$, and $V0_{4-2}$). Voltage sub-bins 14, 15, 16, 17, and 18 are assigned soft bits 001, 101, 100, 110, and 111, respectively.

The fifth primary voltage bin (HB=111) is divided into five voltage sub-bins 19, 20, 21, 22, and 23 by secondary reference voltages ($V0_{4+1}$, $V0_{4+2}$, $V0_{5-1}$, and $V0_{5-2}$). Voltage sub-bins 19, 20, 21, 22, and 23 are assigned soft bits 111, 110, 100, 101, and 001, respectively.

The sixth primary voltage bin (HB=110) is divided into five voltage sub-bins 24, 25, 26, 27, and 28 by secondary reference voltages ($V0_{5+1}$, $V0_{5+2}$, $V0_{6-1}$, and $V0_{6-2}$). Voltage sub-bins 24, 25, 26, 27, and 28 are assigned soft bits 001, 101, 100, 110, and 111, respectively.

The seventh primary voltage bin (HB=100) is divided into five voltage sub-bins 29, 30, 31, 32, and 33 by secondary reference voltages ($V0_{6+1}$, $V0_{6+2}$, $V0_{7-1}$, and $V0_{7-2}$). Voltage sub-bins 29, 30, 31, 32, and 33 are assigned soft bits 111, 110, 100, 101, and 001, respectively.

The eighth primary voltage bin (HB=101) is divided into three voltage sub-bins 34, 35, and 36 by secondary reference voltages ($V0_{7+1}$ and $V0_{7+2}$). Voltage sub-bins 34, 35, and 36, are assigned soft bits 001, 101, and 100, respectively. The voltage sub-bins 1-36 correspond to increasing threshold voltage level.

During a read operation of the storage element represented by the sensing chart 700, the threshold voltage of the storage element is sensed and the voltage sub-bin in which the threshold voltage resides is identified. The hard bit and soft bits corresponding to the voltage sub-bin in which the sensed threshold voltage resides is transmitted from the data register 116 of the memory 100 to the ECC decoder of the external controller 302. For example, if the sensed threshold voltage resides within voltage sub-bin 21, the bit stream 111100 (corresponding to HB=111, SB=100) is transmitted from the data register 116 of the memory 100 to the ECC decoder of the external controller 302. The ECC decoder then functions to use the received HB/SB bit stream to determine which primary voltage bin includes the sensed threshold voltage of the storage element, and thereby what data is stored in the storage element.

Figure 7B:
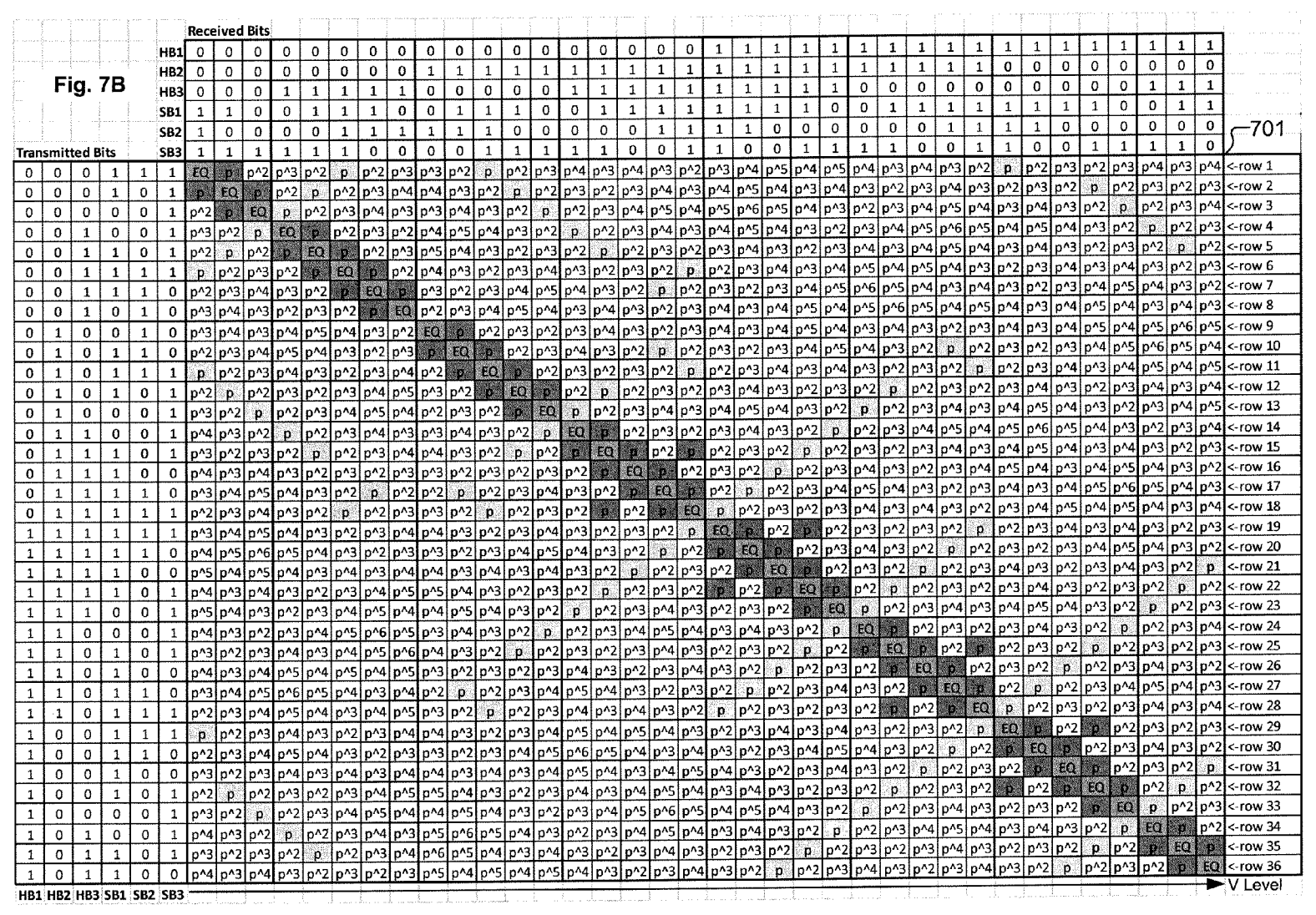

FIG. 7B shows a probability chart 701 of transmitted bit stream versus received bit stream for a reading operation from the storage element operated according to the sensing chart 700 of FIG. 7A, in accordance with one embodiment of the present invention. In the probability chart 701, the sequence of transmitted bit streams as ordered from top to bottom of the chart 701 matches the sequence of received bit streams as ordered from left to right of the chart 701, which corresponds to the possible transmitted bit streams as a function of increasing sensed threshold voltage level. Thus, a diagonal series of cells extending from the top-left to the bottom-right of the chart corresponds to error free transmission of the bit stream from the data register 116 of the memory 100 to the ECC decoder of the external controller 302.

Each cell within the chart 701 shows a probability of obtaining the corresponding received bit stream from the corresponding transmitted bit stream. In the probability chart 701, the bit-error probability is represented by p. Also, the probability of receiving an incorrect bit stream is equal to $p^z$, where z is the number of bits in error in the received bit stream. And, the probability of having a correctly received bit stream, as denoted by EQ, is one minus a sum of the probabilities of occurrence of all incorrectly received bit streams.

The probability chart 701 shows that none of the transmitted bit streams have a monotonically varying received bit stream error probability in each direction moving away from the correctly received bit stream probability (EQ). Therefore, with the complexity of the storage element operation as represented in FIGS. 7A-7B and the correspondingly complex bit streams to be transmitted over the I/O bus 102, FIGS. 7A-7B represent an example embodiment in which the more reliably decoded bit streams can be determined based on a transmitted bit stream that maps to a lower number of received bit streams in which a probability of hard bit error is equal to a dominant probability term, as opposed to a pure monotonic behavior in received bit stream error probability. More specifically, in one embodiment, the transmitted bit streams that have a lowest total probability of having a single hard bit error with no soft bit errors may be designated as the more reliably decoded bit streams.

FIG. 7C shows a chart 703 of the number of cases (Np) in which the probability of hard bit error is (p), i.e., the dominant error probability term, for each transmitted bit stream, i.e., for each row, in accordance with one embodiment of the present invention. With regard to FIG. 7C, the number of cases (Np) represents a number of received bit streams for a given transmitted bit stream. As shown in chart 703, transmitted bit streams [001010] and [010010] corresponding to rows 8 and 9, have the lowest number of cases in which the probability of hard bit error is (p), and are thereby designated as the more reliably decoded bit streams. In the embodiment of FIGS. 7A-7C, the aliasing module 501 can be defined to alias a more frequently transmitted bit stream that is less reliably decoded to either bit stream [001010] or bit stream [010010], each of which is more reliably decoded. Correspondingly, the de-aliasing module 503 can be defined to de-alias the bit stream upon its arrival at the external controller 302.

In view of the foregoing, it should be understood that the aliasing module 501 and de-aliasing module 503 together form a system for bit stream aliasing in a memory system, in accordance with one embodiment of the present invention. The aliasing module 501 is defined and connected to receive a first bit stream to be transmitted over the data bus 102 from the memory 100 to the external controller 302 of the memory 100. In one embodiment, the aliasing module 501 is defined and connected to receive the first bit stream from the data register 116 of the memory 100. The aliasing module 501 is defined and connected to alias the first bit stream as a second bit stream and transmit the second bit stream over the data bus 102 in lieu of the first bit stream. The de-aliasing module 503 is defined and connected to receive the second bit stream from the data bus 102 at the external controller 302. The de-aliasing module 503 is defined and connected to de-alias the received second bit stream back to the first bit stream and provide the first bit stream to the external controller 302 for processing. In one embodiment, the de-aliasing module 503 is defined and connected to provide the first bit stream to an error correction code decoder within the external controller 302 of the memory 100.

In one embodiment, the aliasing module 501 is defined as separate circuitry external to the memory 100, such as discussed with regard to FIG. 5A. In another embodiment, the aliasing module 501 is defined as circuitry internal to the memory 100, such as discussed with regard to FIG. 5B. In one embodiment, the de-aliasing module 503 is defined as separate circuitry external to the external controller 302, such as discussed with regard to FIG. 5A. In another embodiment, the de-aliasing module 503 is defined as circuitry internal to the external controller 302, such as discussed with regard to FIG. 5B.

In one embodiment, the aliasing module 501 is defined to be programmed with data specifying an identity of the first bit stream, and with data specifying an identity of the second bit stream, and with data specifying an aliasing enablement condition, i.e., aliasing enabled, or aliasing not enabled. In another embodiment, the aliasing module 501 is hard-wired to alias the first bit stream as the second bit stream each time the first bit stream is to be transmitted over the data bus 102 from the memory 100 to the external controller 302.

In one embodiment, the de-aliasing module 503 is defined to be programmed with data specifying an identity of the first bit stream, and with data specifying an identity of the second bit stream, and with data specifying a de-aliasing enablement condition, i.e., de-aliasing enabled, or de-aliasing not enabled. In another embodiment, the de-aliasing module 503 is hard-wired to de-alias the second bit stream back to the first bit stream each time the second bit stream is received from the data bus 102 at the external controller 302.

In one embodiment, the first bit stream is a more frequently transmitted bit stream from the memory 100 to the external controller 302, and the second bit stream is more reliably decoded by the error correction code decoder at the external controller 302 as compared to the first bit stream. In one version of this embodiment, the first bit stream is associated with a non-monotonically varying probability of received bit stream error occurrence as a function of storage element threshold voltage level. Also in this embodiment, the second bit stream is associated with a monotonically varying probability of received bit stream error occurrence as a function of storage element threshold voltage level. In another embodiment, the second bit stream corresponds to a transmitted bit stream that maps to a lower number of received bit streams in which a probability of hard bit error is equal to a dominant probability term.

Additionally, in view of the foregoing, it should be understood that the present invention can be embodied as the memory system 500/500A. In one embodiment, the memory system 500/500A is a flash memory system. The memory system 500/500A includes the memory array 108, the data register 116, the aliasing module 501, the data bus 102, the de-aliasing module 503, and the external controller 302, along with the other memory system 500/500A components discussed herein. The data register 116 is defined and connected to receive and store a first bit stream from the memory array 108. The aliasing module 501 is defined and connected to receive the first bit stream from the data register 116 and alias the first bit stream as a second bit stream. The aliasing module 501 is also defined and connected to transmit the second bit stream over the data bus 102 in lieu of the first bit stream.

The data bus 102 is connected to receive the second bit stream transmitted from the aliasing module 501. The de-aliasing module 503 is connected to receive the second bit stream transmitted over the data bus 102 from the aliasing module 501 and de-alias the second bit stream back to the first bit stream. The external controller 302 includes an error correction code decoder connected to receive the first bit stream from the de-aliasing module 503. In one embodiment, the first bit stream is a more frequently transmitted bit stream from the memory array 108 to the external controller 302, and the second bit stream is more reliably decoded by the error correction code decoder at the external controller 302 as compared to the first bit stream.

In one embodiment, the aliasing module 501 is hard-wired to alias the first bit stream as the second bit stream each time the first bit stream is to be transmitted over the data bus 102. Also, in one embodiment, the de-aliasing module 503 is hard-wired to de-alias the second bit stream back to the first bit stream each time the second bit stream is received from the data bus 102. In yet another embodiment, each of the aliasing and de-aliasing modules 501/503 is defined to be programmed with data specifying an identity of the first bit stream, and with data specifying an identity of the second bit stream, and with data specifying an aliasing and de-aliasing enablement condition.

Figure 8:
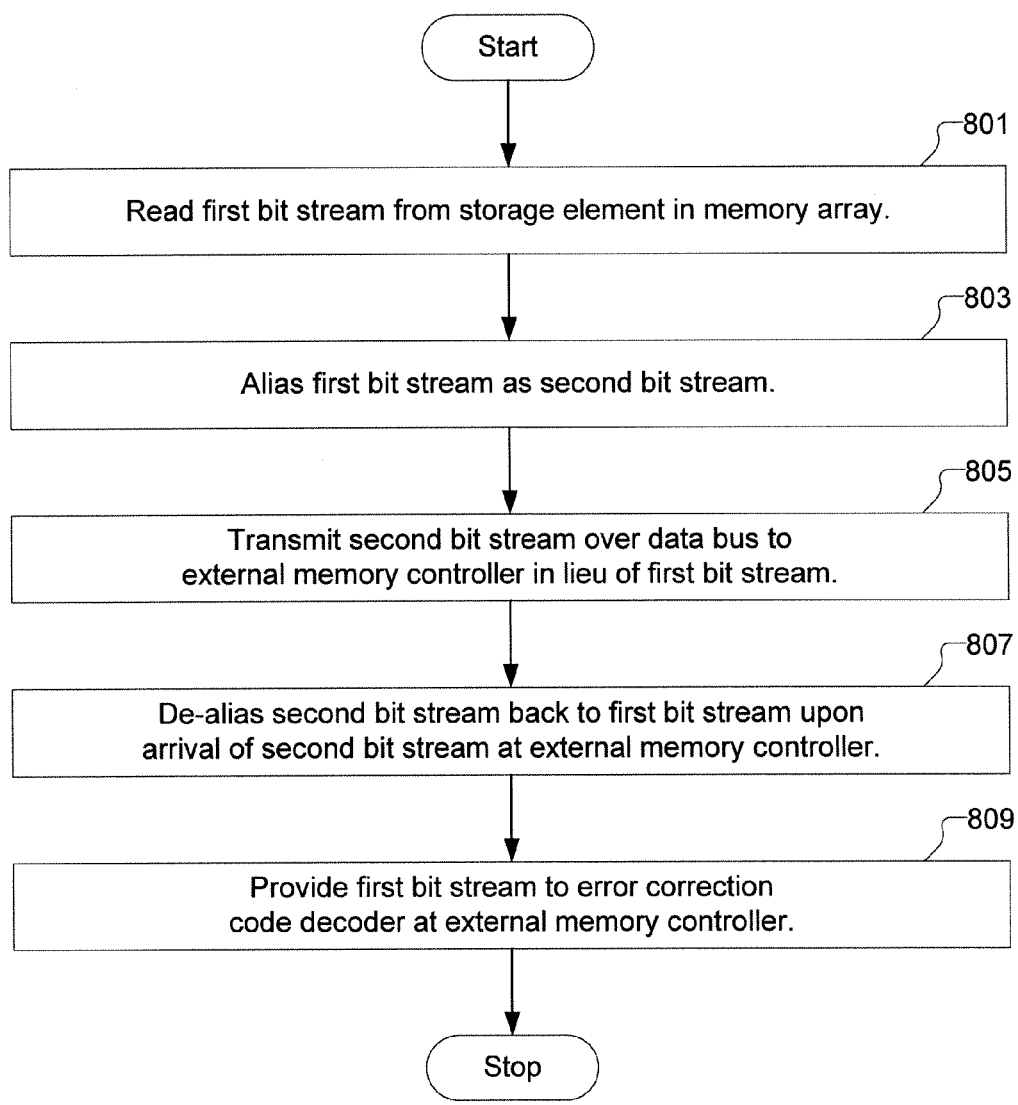
FIG. 8 shows a method for operating a memory system, in accordance with one embodiment of the present invention.

FIG. 8 shows a method for operating a memory system, in accordance with one embodiment of the present invention. The method includes an operation 801 for reading a first bit stream from a storage element in a memory array. The method also includes an operation 803 for aliasing the first bit stream as a second bit stream. The method also includes an operation 805 for transmitting the second bit stream over a data bus to an external memory controller in lieu of the first bit stream. The method further includes an operation 807 for de-aliasing the second bit stream back to the first bit stream upon arrival of the second bit stream at the external memory controller. And, the method includes an operation 809 for providing the first bit stream to an error correction code decoder at the external memory controller.

In one embodiment, the first bit stream is a more frequently transmitted bit stream from the memory to the external controller, and the second bit stream is more reliably decoded by the error correction code decoder at the external controller as compared to the first bit stream. In one version of this embodiment, the first bit stream is associated with a non-monotonically varying probability of received bit stream error occurrence as a function of storage element threshold voltage level, and the second bit stream is associated with a monotonically varying probability of received bit stream error occurrence as a function of storage element threshold voltage level. In another embodiment, the second bit stream corresponds to a transmitted bit stream that maps to a lower number of received bit streams in which a probability of hard bit error is equal to a dominant probability term.

In one embodiment, the method can also include an operation for programming the aliasing module with data specifying an identity of the first bit stream, and with data specifying an identity of the second bit stream, and with data specifying an aliasing enablement condition. Also, in one embodiment, the method can include an operation for programming the de-aliasing module with data specifying an identity of the first bit stream, and with data specifying an identity of the second bit stream, and with data specifying a de-aliasing enablement condition.

The invention described herein can be embodied as computer readable code on a computer readable medium. For example, the computer readable code can include one or more layout data files within which one or more layouts corresponding to the aliasing module 501 and/or the de-aliasing module 503 are stored. The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, solid-state digital data storage devices, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the aliasing module 501 and/or de-aliasing module 503 as disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A system for bit stream aliasing in a memory system, comprising:
    an aliasing module defined and connected to receive a first bit stream to be transmitted over a data bus from a memory to an external controller of the memory, the aliasing module defined and connected to alias the first bit stream as a second bit stream and transmit the second bit stream over the data bus in lieu of the first bit stream; and
    a de-aliasing module defined and connected to receive the second bit stream from the data bus at the external controller, the de-aliasing module defined and connected to de-alias the received second bit stream back to the first bit stream and provide the first bit stream to the external controller for processing.

2. The system as recited in claim 1, wherein the aliasing module is defined and connected to receive the first bit stream from a data register of the memory.

3. The system as recited in claim 1, wherein the aliasing module is defined as separate circuitry external to the memory.

4. The system as recited in claim 1, wherein the aliasing module is defined as circuitry internal to the memory.

5. The system as recited in claim 1, wherein the de-aliasing module is defined and connected to provide the first bit stream to an error correction code decoder within the external controller of the memory.

6. The system as recited in claim 1, wherein the de-aliasing module is defined as separate circuitry external to the external controller.

7. The system as recited in claim 1, wherein the de-aliasing module is defined as circuitry internal to the external controller.

8. The system as recited in claim 1, wherein the aliasing module is defined to be programmed with data specifying an identity of the first bit stream, and with data specifying an identity of the second bit stream, and with data specifying an aliasing enablement condition.

9. The system as recited in claim, wherein the aliasing module is hard-wired to alias the first bit stream as the second bit stream each time the first bit stream is to be transmitted over the data bus from the memory to the external controller.

10. The system as recited in claim 1, wherein the de-aliasing module is defined to be programmed with data specifying an identity of the first bit stream, and with data specifying an identity of the second bit stream, and with data specifying a de-aliasing enablement condition.

11. The system as recited in claim 1, wherein the de-aliasing module is hard-wired to de-alias the second bit stream back to the first bit stream each time the second bit stream is received from the data bus at the external controller.

12. The system as recited in claim 5, wherein the first bit stream is a more frequently transmitted bit stream from the memory to the external controller, and wherein the second bit stream is more reliably decoded by the error correction code decoder at the external controller as compared to the first bit stream.

13. The system as recited in claim 12, wherein the first bit stream is associated with a non-monotonically varying probability of received bit stream error occurrence as a function of storage element threshold voltage level, and wherein the second bit stream is associated with a monotonically varying probability of received bit stream error occurrence as a function of storage element threshold voltage level.

14. The system as recited in claim 12, wherein the second bit stream corresponds to a transmitted bit stream that maps to a lower number of received bit streams in which a probability of hard bit error is equal to a dominant probability term.

15. A memory system, comprising:
    a memory array;
    a data register defined and connected to receive and store a first bit stream from the memory array;

an aliasing module defined and connected to receive the first bit stream from the data register and alias the first bit stream as a second bit stream, the aliasing module defined and connected to transmit the second bit stream in lieu of the first bit stream;

a data bus connected to receive the second bit stream transmitted from the aliasing module;

a de-aliasing module connected to receive the second bit stream transmitted over the data bus from the aliasing module and de-alias the second bit stream back to the first bit stream; and an external controller including an error correction code decoder connected to receive the first bit stream from the de-aliasing module.

16. The memory system of claim 15, wherein the memory system is a flash memory system.

17. The memory system of claim 15, wherein the aliasing module is hard-wired to alias the first bit stream as the second bit stream each time the first bit stream is to be transmitted over the data bus, and wherein the de-aliasing module is hard-wired to de-alias the second bit stream back to the first bit stream each time the second bit stream is received from the data bus.

18. The memory system of claim 15, wherein each of the aliasing and de-aliasing modules is defined to be programmed with data specifying an identity of the first bit stream, and with data specifying an identity of the second bit stream, and with data specifying an aliasing and de-aliasing enablement condition.

19. The memory system of claim 15, wherein the first bit stream is a more frequently transmitted bit stream from the memory array to the external controller, and wherein the second bit stream is more reliably decoded by the error correction code decoder at the external controller as compared to the first bit stream.

20. A method for operating a memory system, comprising:
reading a first bit stream from a storage element in a memory array;
aliasing the first bit stream as a second bit stream;
transmitting the second bit stream over a data bus to an external memory controller in lieu of the first bit stream;
de-aliasing the second bit stream back to the first bit stream upon arrival of the second bit stream at the external memory controller; and
providing the first bit stream to an error correction code decoder at the external memory controller.

21. The method as recited in claim 20, wherein the first bit stream is a more frequently transmitted bit stream from the memory to the external controller, and wherein the second bit stream is more reliably decoded by the error correction code decoder at the external controller as compared to the first bit stream.

22. The method as recited in claim 21, wherein the first bit stream is associated with a non-monotonically varying probability of received bit stream error occurrence as a function of storage element threshold voltage level, and wherein the second bit stream is associated with a monotonically varying probability of received bit stream error occurrence as a function of storage element threshold voltage level.

23. The method as recited in claim 21, wherein the second bit stream corresponds to a transmitted bit stream that maps to a lower number of received bit streams in which a probability of hard bit error is equal to a dominant probability term.

24. The method as recited in claim 20, further comprising:
programming the aliasing module with data specifying an identity of the first bit stream, and with data specifying an identity of the second bit stream, and with data specifying an aliasing enablement condition.

25. The method as recited in claim 20, further comprising:
programming the de-aliasing module with data specifying an identity of the first bit stream, and with data specifying an identity of the second bit stream, and with data specifying a de-aliasing enablement condition.

\* \* \* \* \*